United States Patent
Shen et al.

(10) Patent No.: US 11,574,223 B2
(45) Date of Patent: Feb. 7, 2023

(54) METHOD AND APPARATUS FOR RAPID DISCOVERY OF SATELLITE BEHAVIOR

(71) Applicant: INTELLIGENT FUSION TECHNOLOGY, INC., Germantown, MD (US)

(72) Inventors: Dan Shen, Germantown, MD (US); Carolyn Sheaff, Rome, NY (US); Jingyang Lu, Germantown, MD (US); Genshe Chen, Germantown, MD (US); Erik Blasch, Arlington, VA (US); Khanh Pham, Kirtland AFB, NM (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 312 days.

(21) Appl. No.: 16/595,107

(22) Filed: Oct. 7, 2019

(65) Prior Publication Data
US 2021/0103841 A1  Apr. 8, 2021

(51) Int. Cl.
| | | |
|---|---|---|
| *G06N 7/00* | (2006.01) | |
| *B64G 3/00* | (2006.01) | |
| *G06N 20/00* | (2019.01) | |

(52) U.S. Cl.
CPC .............. *G06N 7/005* (2013.01); *B64G 3/00* (2013.01); *G06N 20/00* (2019.01)

(58) Field of Classification Search
CPC .......... G06N 7/005; G06N 20/00; B64G 3/00
See application file for complete search history.

(56) References Cited

U.S. PATENT DOCUMENTS

| | | | | |
|---|---|---|---|---|
| 2014/0072233 | A1* | 3/2014 | Horwood | G01S 13/726 382/201 |
| 2015/0066481 | A1* | 3/2015 | Terrell | G06F 40/30 704/9 |

(Continued)

FOREIGN PATENT DOCUMENTS

CN  109977871 A  *  7/2019

OTHER PUBLICATIONS

Chatterjee, S., Tipireddy, R., Oster, M. and Halappanavar, M., 2016, May. Propagating mixed uncertainties in cyber attacker payoffs: exploration of two-phase Monte Carlo sampling and probability bounds analysis. In 2016 IEEE Symposium on Technologies for Homeland Security (HST) (pp. 1-6). IEEE. (Year: 2016).*

(Continued)

*Primary Examiner* — Ying Yu Chen
(74) *Attorney, Agent, or Firm* — Anova Law Group, PLLC

(57) ABSTRACT

A method for rapid discovery of satellite behavior, applied to a pursuit-evasion system including at least one satellite and a plurality of space sensing assets. The method includes performing transfer learning and zero-shot learning to obtain a semantic layer using space data information. The space data information includes simulated space data based on a physical model. The method further includes obtaining measured space-activity data of the satellite from the space sensing assets; performing manifold learning on the measured space-activity data to obtain measured state-related parameters of the satellite; modeling the state uncertainty and the uncertainty propagation of the satellite based on the measured state-related parameters; and performing game reasoning based on a Markov game model to predict satellite behavior and management of the plurality of space sensing (Continued)

assets according to the semantic layer and the modeled state uncertainty and uncertainty propagation.

14 Claims, 10 Drawing Sheets

(56) References Cited

U.S. PATENT DOCUMENTS

2016/0369777 A1* 12/2016 Chiang ................ G05B 23/024
2019/0303703 A1* 10/2019 Kumar .................. G06N 3/084

OTHER PUBLICATIONS

Shen, D., Jia, B., Chen, G., Blasch, E. and Pham, K., 2015, May. Pursuit-evasion games with information uncertainties for elusive orbital maneuver and space object tracking. In Sensors and Systems for Space Applications VIII (vol. 9469, p. 94690J). International Society for Optics and Photonics. (Year: 2015).*

Shen, D., Jia, B., Chen, G., Pham, K. and Blasch, E., 2017, March. Game optimal sensor management strategies for tracking elusive space objects. In 2017 IEEE Aerospace Conference (pp. 1-8). IEEE. (Year: 2017).*

Boros, E., Elbassioni, K., Gurvich, V. and Makino, K., 2018. Markov decision processes and stochastic games with total effective payoff. Annals of Operations Research, pp. 1-29. (Year: 2018).*

Bhagyashree R, 5 types of deep transfer learning, Nov. 25, 2018, https://hub.packtpub.com/5-types-of-deep-transfer-learning/ (Year: 2018).*

Fu, Z., Xiang, T., Kodirov, E. and Gong, S., 2015. Zero-shot object recognition by semantic manifold distance. In Proceedings of the IEEE conference on computer vision and pattern recognition (pp. 2635-2644). (Year: 2015).*

* cited by examiner

METHOD AND APPARATUS FOR RAPID DISCOVERY OF SATELLITE BEHAVIOR

GOVERNMENT RIGHTS

This invention was made with Government support under Contract No. FA8750-18-C-0106, awarded by the United States Air Force Research Laboratory (AFRL). The U.S. Government has certain rights in this invention.

FIELD OF THE DISCLOSURE

The present disclosure generally relates to the field of satellite communication technology and, more particularly, relates to a method and an apparatus for rapid discovery of satellite behavior.

BACKGROUND

Since space has been accessible, society has become more dependent on space superiority across a broad spectrum of military, civilian, and commercial applications. The dependence brings an inherent vulnerability, particularly the lack of persistent situation awareness of the space operational environment to ensure freedom of action. Space is considered as an important frontier because information from the space has become extremely vital for strategic decisions. The presence of adversaries in addition to real-time and hidden information constraints greatly complicates space situational awareness (SSA). Knowing the locations of space objects from low-level information fusion supports high-level information fusion SSA tasks of sensor, user, and mission refinement. To accurately provide SSA, resident space object (RSO) assessment can be coordinated through a user-defined operating picture (UDOP).

Space superiority requires space control and space situational awareness (SSA), which rely on rapid and accurate space object behavioral discovery. The focus of the present disclosure is to develop a stochastic approach for rapid discovery of changed satellite behavior utilizing machine learning methods. The design of the innovative decision support tool has numerous challenges: (i) partial observable actions; (ii) resident space objects; (iii) uncertainties modeling and propagation; (iv) real-time requirements, and (v) computational intractable algorithms.

Space access analysis and mission trade-off studies are vital for the success of space-borne operations. Space object tracking algorithms can be compared based on gathering data to track satellites, debris, and natural phenomena (e.g., solar flares, comets, asteroids). Tracking is associated with sensor management to point sensors for observations and determine the situation and threat awareness. SSA enhancements include models (e.g., orbital mechanics), measurements, computational software (e.g., tracking), and application-based systems coordination (e.g., situations). For example, game-theory approaches for SSA allow for pursuit-evasion (PE) analysis.

In the present disclosure, a solution called adaptive Markov inference game optimization (AMIGO) method for rapid discovery of satellite behavior is developed and implemented. The AMIGO method is an adaptive feedback game theoretic approach, and gets information from sensors about the relations between the resident space objects (RSOs) of interest and ground and space sensing assets. The relations are determined by both the RSOs and sensing assets. Therefore, the AMIGO method represents the situation as a game instead of a control problem. The game reasoning utilizes data level fusion, stochastic modeling/propagation, and RSO detection/tracking to predict the future RSOs-GSAs relations. The game engine also supports optional space pattern dictionary/semantic rules for adaptive transition matrices in the Markov game. If no existing pattern dictionary is available, AMIGO builds an initial pattern and revises it during the game reasoning. The outputs of AMIGO reasoning include two kinds of control methods: (i) processing of measurements and (ii) localization of RSOs. The two sets form a game equilibrium, one for sensing asset management and the other for the estimation of RSO behavior. The present disclosure will be focused on machine learning and training data generation.

BRIEF SUMMARY OF THE DISCLOSURE

One aspect of the present disclosure provides a method for rapid discovery of satellite behavior, applied to a pursuit-evasion (PE) system including at least one satellite and a plurality of space sensing assets. The method includes performing transfer learning and zero-shot learning to obtain a semantic layer using space data information. The space data information includes simulated space data based on a physical model. The method further includes obtaining measured space-activity data of the at least one satellite from the plurality of space sensing assets; performing manifold learning on the measured space-activity data to obtain measured state-related parameters of the at least one satellite; modeling state uncertainty and uncertainty propagation of the at least one satellite based on the measured state-related parameters; and performing game reasoning based on a Markov game model to predict satellite behavior of the at least one satellite and management of the plurality of space sensing assets according to the semantic layer and the modeled state uncertainty and uncertainty propagation.

Another aspect of the present disclosure provides an apparatus for rapid discovery of satellite behavior in a PE system that further includes at least one satellite and a plurality of space sensing assets. The apparatus includes a processor and a memory. The memory is configured to store computer-executable instructions. When the processor executes the computer-executable instructions stored in the memory, a method for rapid discovery of satellite behavior is implemented. The method includes performing transfer learning and zero-shot learning to obtain a semantic layer using space data information. The space data information used by the transfer learning/zero-shot learning module includes simulated space data based on a physical model. The method further includes receiving measured space-activity data of the at least one satellite from the plurality of space sensing assets, and performing manifold learning on the measured space-activity data to obtain measured state-related parameters of the at least one satellite; modeling state uncertainty and uncertainty propagation of the at least one satellite based on the measured state-related parameters; and performing game reasoning based on a Markov game model to predict satellite behavior of the at least one satellite and management of the plurality of space sensing assets according to the semantic layer and the modeled state uncertainty and uncertainty propagation.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
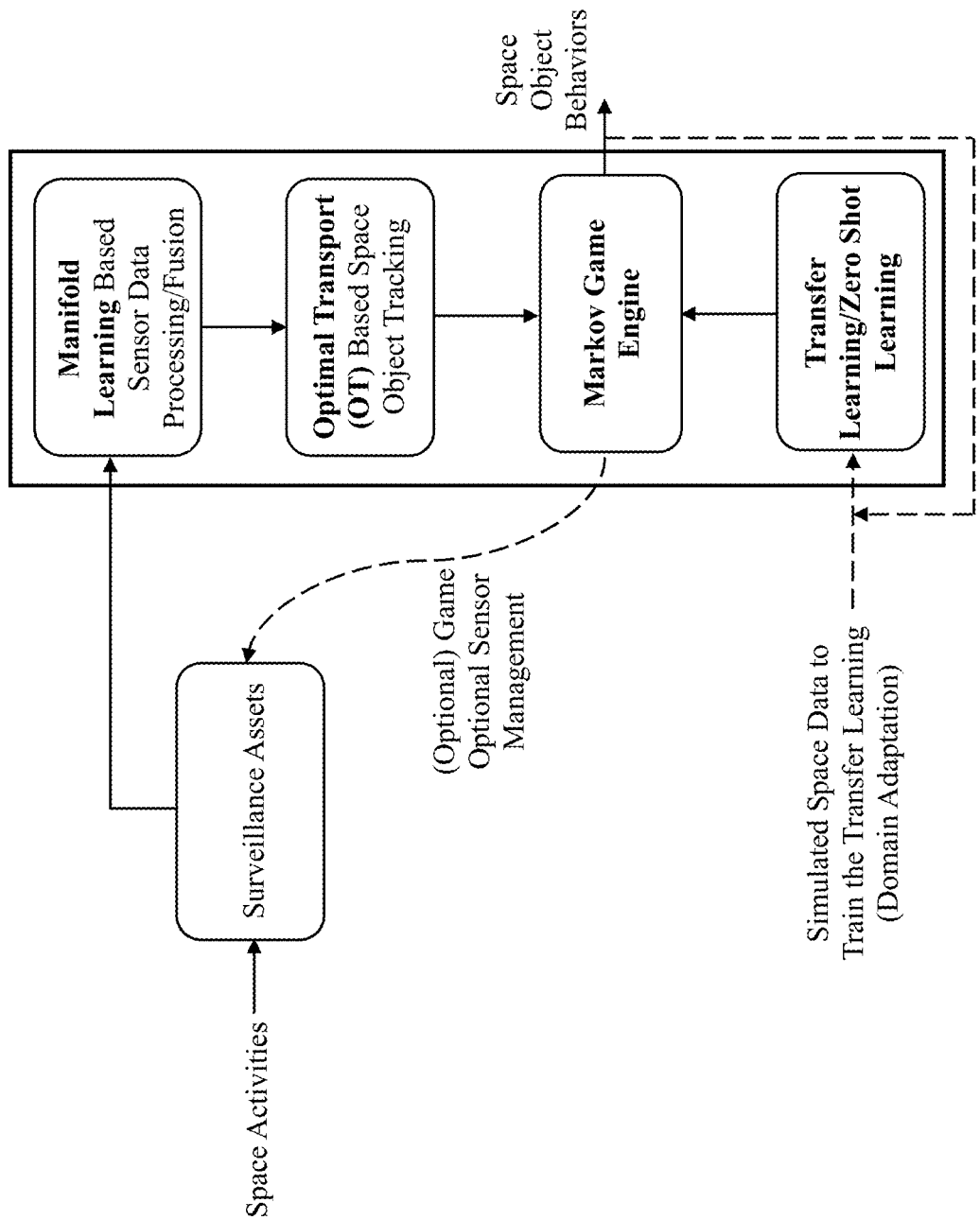
FIG. 1 illustrates a schematic system architecture of an AMIGO method according to various embodiments of the present disclosure.

The present disclosure provides an adaptive Markov inference game optimization (AMIGO) method for rapid discovery of satellite behavior. FIG. 1 illustrates a schematic system architecture of an AMIGO method according to various embodiments of the present disclosure.

Referring to FIG. 1, a Markov game engine may be the central piece of the AMIGO method for detecting unknown patterns of space objects. Since the patterns are unknown, training data may not be available. The Markov game engine may leverage transfer learning and zero-shot learning to recognize unseen classes with available training data from another set (i.e., simulated data) of seen classes. The knowledge transfer may be realized via sharing of an intermediate semantic embedding (e.g., attributes) between seen and unseen classes using manifold learning. The manifold learning may be able to reduce the dimensionality of the sensor data and scale down the object detection and tracking difficulties and enable the rapid detection of space object behavior. According to the present disclosure, to handle the uncertainties in this problem, a $\mathbb{R}^5 \times \mathbb{S}$ coordinate system, where $\mathbb{R}$ is a space of reals and $\mathbb{S}$ denotes a circular space, together with optimal transport (OT) based filtering techniques may be adopted. The key features of the proposed AMIGO method are list as follows.

(1) Markov game—Conflicting space situations are reasoned by a Markov game structure, where system states are represented by distributions instead of deterministic values.

(2) Uncertainty modeling and propagation—a product of a Gaussian distribution of measurement noise and a Von-Mises distribution of initial condition uncertainty is used to represent the uncertainties and both distributions are defined on a cylindrical manifold $\mathbb{R}^5 \times \mathbb{S}$. Relaxed synchronization is adopted for uncertainty propagation with guaranteed convergence.

(3) Optimal transport based tracking of space objects in cylindrical manifolds—The proposed optimal transport (OT) is more accurate than the ensemble Kalman filter (EnKF) for space object tracking problems. In addition, OT is distribution agnostic and it is more general than algorithms that assume uncertainties in $\mathbb{R}^n$.

(4) Pattern dictionary and semantic rules—The machine learning utilizes the intermediate semantic layer from zero-shot learning. In the AMIGO solution, the semantic layer can dynamically and adaptively change the transition matrices in the Markov game. This semantic layer depicts the relationships between features, attributes, and classes. It can also speed up the Markov game reasoning.

(5) Course of actions for behavior modeling—The RSO's behavior is modelled by a course of action (CoA), which tells what the RSO is doing and what the RSO might do in next several steps.

(6) Manifold learning for data level sensor fusion—The sensor raw data usually have high dimensionalities. Since the measurement data streams are reflections of observed satellites, whose states can be determined by only a few parameters, it is reasonable to assume the measurement domain has a low intrinsic dimensionality. Manifold learning algorithms reduce dimensionalities and save the communication bandwidth.

The emulated satellite positions may be used as measurements, and the results of the measurements may be used to perform multiple space object tracking to refine the position estimates. Then, the tracking estimates may go to the space object maneuver detection and collision alert. The satellite maneuver commands may be translated to platform commands to emulate sensor management, space object movement, and course of actions.

As shown in FIG. 1, the AMIGO method is an adaptive feedback game theoretic approach. The method may get information through sensors about the relations between the RSOs of interests and ground/space sensing assets. The relations may be determined by both the RSOs and GSAs. Therefore, it is a game instead of control problem. The game reasoning may interact with data level fusion, the uncertainty modeling/propagation, and RSO detection/tracking to predict the future RSOs-SAs relations. The game engine may also support optional space pattern dictionary/semantic rules for adaptive transition matrices in the Markov game. The AMIGO method may determine two forms of a game equilibrium: one for space sensing asset management, and the other for RSO behavior estimation.

A stochastic game introduced by Lloyd Shapley in the early 1950s, is a dynamic game with probabilistic transitions played by one or more players. The game may be played in a sequence of stages. At the beginning of each stage, the game may be in one of a variety of possible states. The players may select actions and each player may receive a payoff depending on the current state and the selected actions. The game may then move to a new random state whose distribution depends on the previous state and the actions chosen by the players. The procedure may be repeated at the new state and the play may continue for a finite or infinite number of stages. The total payoff to a player may often be taken as the discounted sum of the stage payoffs or the limit inferior of the averages of the stage payoffs. Stochastic games may generalize both Markov decision processes and repeated games.

A Markov (stochastic) game may be given by (i) a finite set of players N, (ii) a set of states, S, (iii) for very player I $\in$ N, a finite set of available actions $D^i$ (the overall action space D is denoted as $D=\times i\in_N D^i$), (iv) a transition rule q: $S\times D \rightarrow \Delta(S)$, where $\Delta(S)$ is the space of all probability distributions over S, and (v) a payoff function r: $S\times D \rightarrow R^N$. A developed Markov game engine according to the present disclosure may be modified using specific information of event extraction.

For example, an action-value function corresponding to actions taken in a preset period may be examined to predict satellite behavior, sensor management, and course of actions. The action-value function may be a discounted sum of the payoff functions of the actions taken in the preset period. That is, for every two consecutive actions taken in the preset period, the weight of the former action may be reduced by a discount factor ranging between 0 and 1. In one embodiment, the payoff function may be the distance between the measured state and the predicted state.

Figure 2:
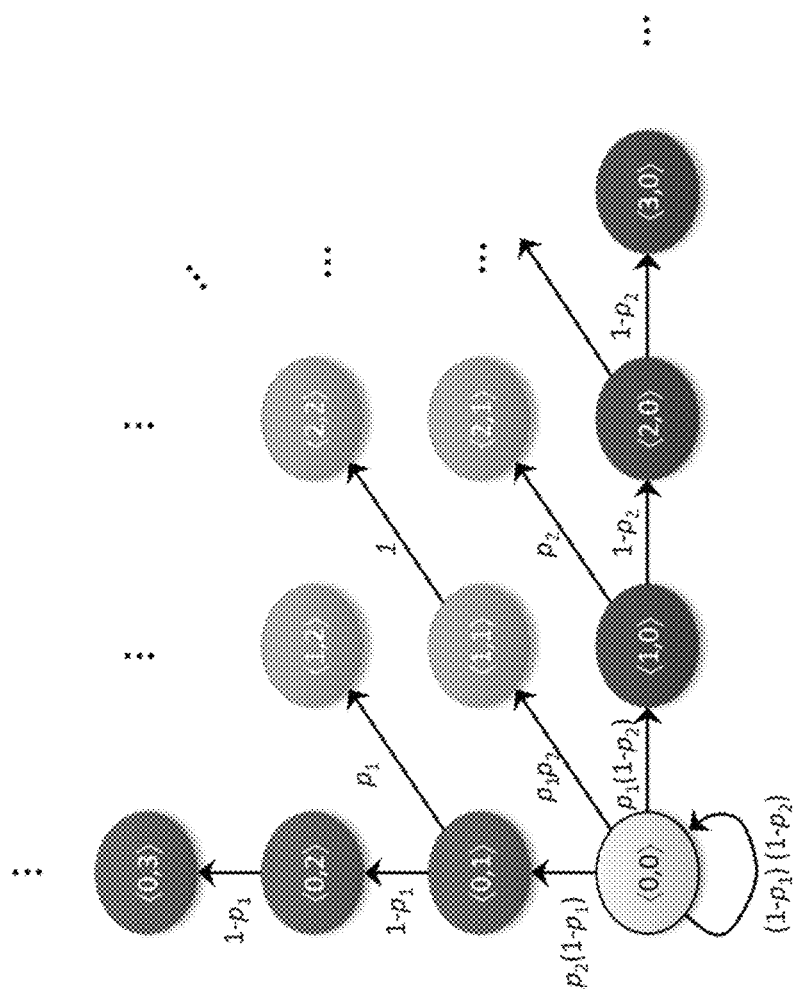
FIG. 2 illustrates a schematic diagram of states in a Markov game according to various embodiments of the present disclosure.

FIG. 2 illustrates a visual depiction of state of a simple game. Referring to FIG. 2, in the simple game, two players may be considered and each of the two players may have two actions. The arrows in FIG. 2 show the possible transitions from one state to another. The initial state is represented by an ellipse label as (0, 0); each ellipse along a horizontal row on the bottom, except for the initial state (0, 0), indicates a state where only player 1 changes the strategy; each ellipse along a vertical column on the left, except for the initial state (0, 0), denotes a state where only player 2 adjusts the strategy; and the other ellipses denote states where maneuvers of both players take place.

The AMIGO method may use a two-player Markov game to investigate the sensor management for tracking space objects. Whether deliberately or unintentionally, some of space objects may cause confusion to observers (satellites) by performing orbital maneuvers. Generally, the space-object tracking problem can be modeled as a one-sided optimization (optimal control) setup or a two-sided optimization (game) problem. In the optimal control setup, the states (positions and velocities) of space objects may be computed (filtered) based on the sensor measurements. However, the optimal control approach may not consider the intelligence of the space objects that may change their orbits intentionally to make it difficult for the observer to track. The Markov game approach provides a method to solve the SSA problem. According to the method, the observed satellite may exploit the sensing and tracking model to confuse the observer satellite by corrupting their tracking estimates, while the observer satellite may intend to decrease the tracking uncertainties. The uncertainties may be modeled based on the tracking entropy.

Figure 3:
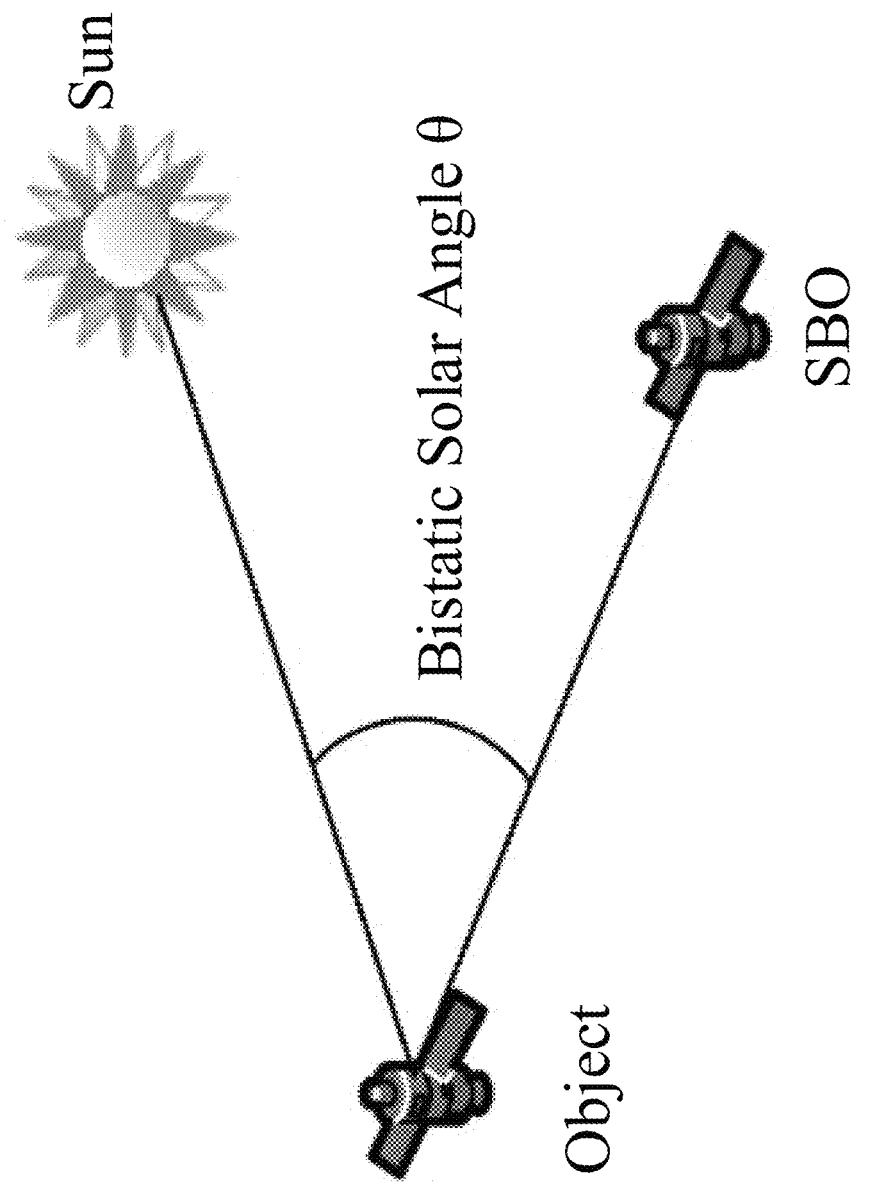
FIG. 3 illustrates a schematic diagram of space based optical sensor with a bistatic solar angle according to various embodiments of the present disclosure.
Figure 4:
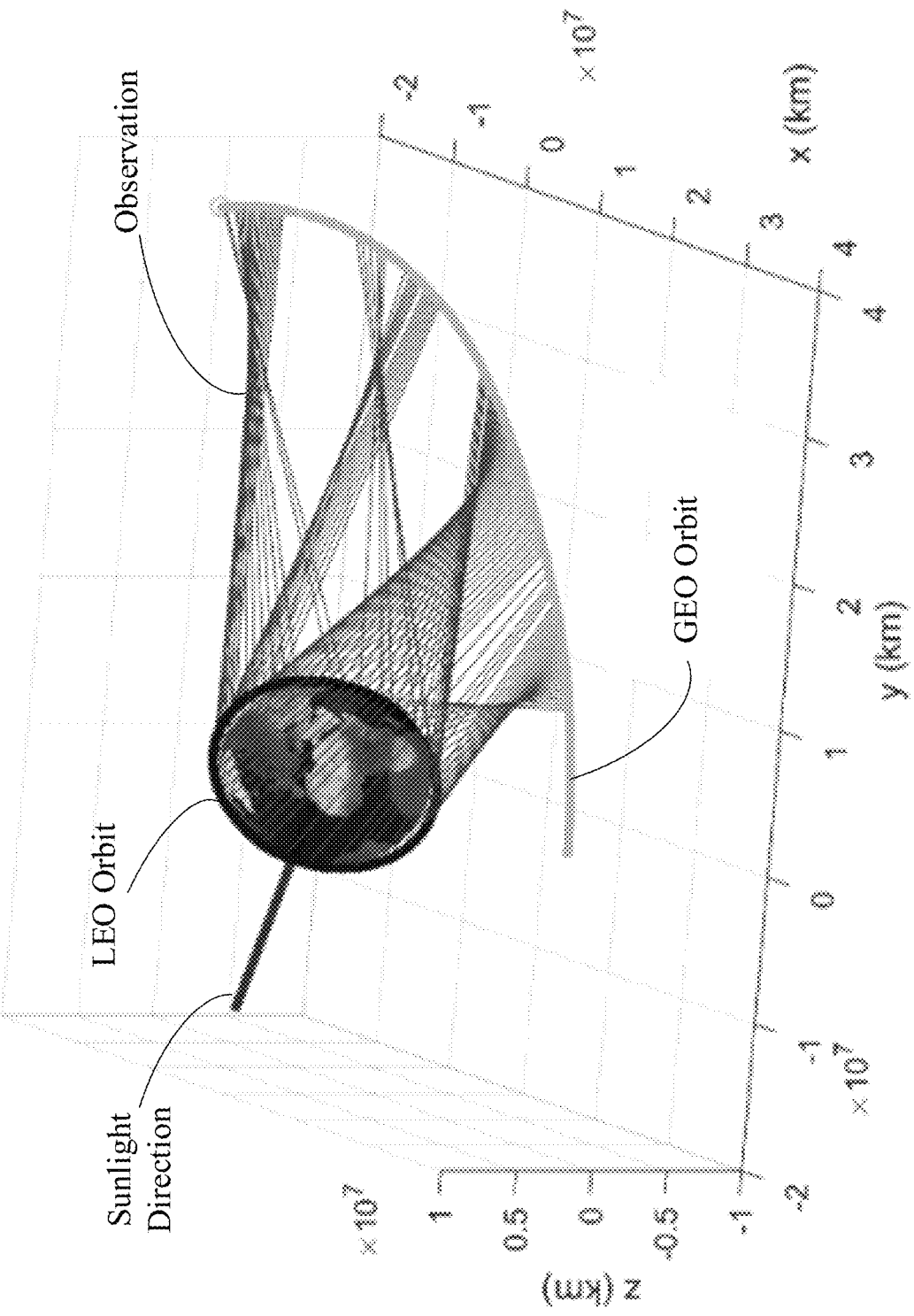
FIG. 4 illustrates a schematic diagram of LEO and GEO under a game-theoretic sensor management and maneuver strategies according to various embodiments of the present disclosure.

For example, the PE game approach may be tested for informational uncertainties with a scenario of two satellites: a space-based low earth orbit (LEO) satellite, i.e. an observer satellite, and a geostationary earth orbit (GEO) satellite, i.e. an observed satellite. A space based optical (SBO) sensor measurement model (referring to FIG. 3) may be adopted. The bistatic solar angle θ may be defined as the angle of the line from the space object to the sun and the line from the object to the SBO. The lighting condition may be strong when the angle is small, and may be weak when the angle θ is large. When θ is large, the space object is hard to be observed due to saturation. The scenario is shown in FIG. 4, where the 'Observation' lines indicate when the SBO sensor resource is used to track the GEO (use the sensor data to lower the uncertainty).

In one embodiment, both the extended Kalman Filter (EKF) and cubature KF (CKF) trackers may converge with intermitted measurements. The tracking errors may increase during a period in which no measurement is performed. The observer satellite's maneuver motions may increase the tracking errors while the sensor measures may be able to reduce the informational entropy.

In the following, the AMIGO machine learning (ML) design will be further described. The AMIGO ML design may detect the resident space object (RSO) behavior pattern through fusing heterogeneous data from multiple sensors—such as position of RSO relative to the observing station, velocity, orbital energy, and angular momentum, etc. The model can be trained off-line, and the well-trained model may be deployed in the real application stage. Also, when the model is put in application, the proposed classifier can also be updated through online-policy learning, which can help improve the system robust to the newly unknown behavior pattern.

Figure 5:
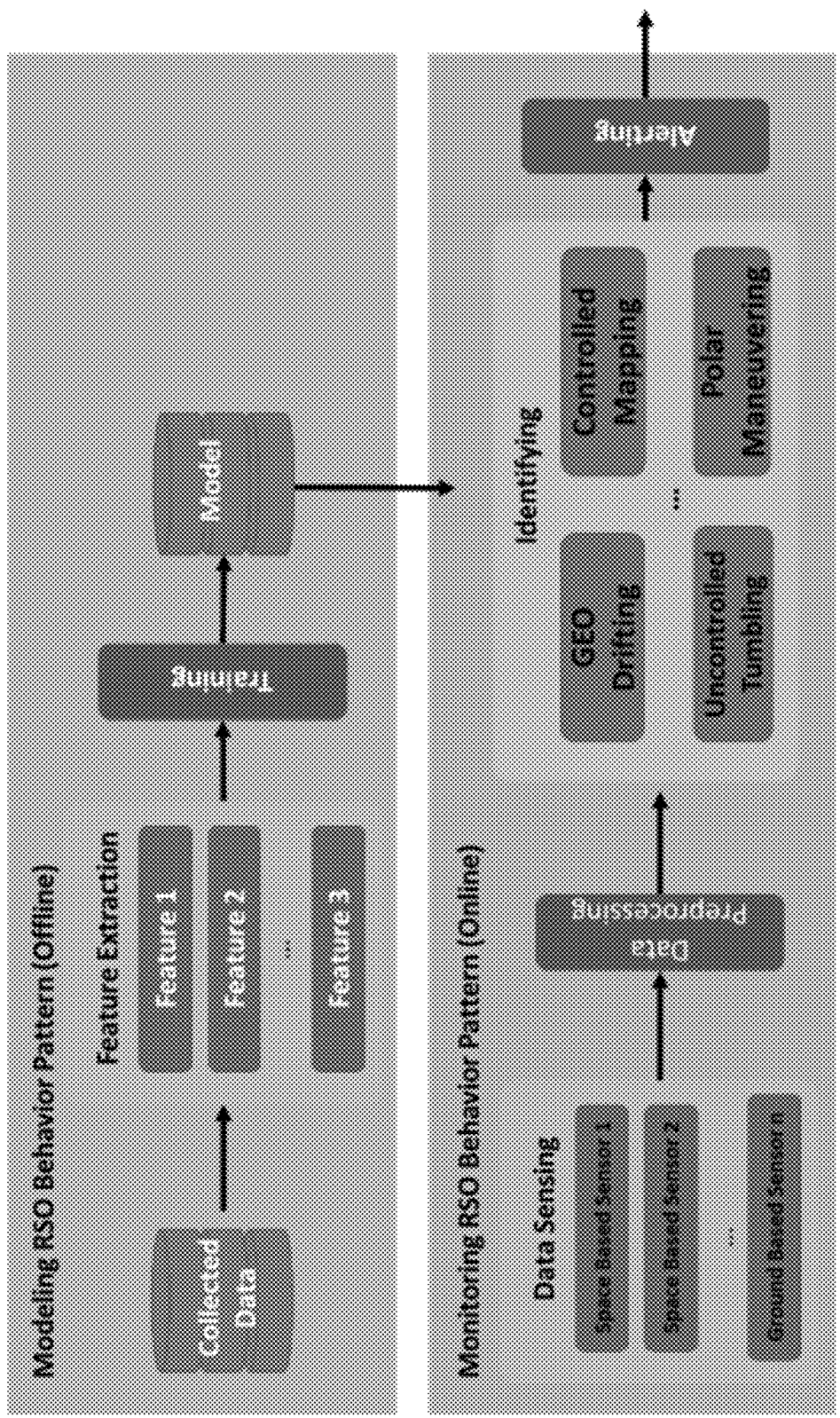
FIG. 5 illustrates a schematic diagram of an RSO behavior pattern classification scheme according to various embodiments of the present disclosure.

FIG. 5 illustrates an architecture of the proposed RSO behavior pattern classification. The whole system may be separated into an offline part-modeling RSO behavior pattern and an online part-monitoring RSO behavior pattern.

In the offline part, Modeling RSO behavior pattern, the system may train a classifier model using machine learning techniques based on the collected data, which could identify specific types of RSO behavior. In the feature extraction, effective features may be extracted from the space data information, including data obtained through simulation and/or data collected by multiple sensors. Afterwards, the features may be trained and a classifier model, capable of realizing fine-grained identification, may be generated. In the online part, monitoring RSO behavior pattern, the system may sense real-time RSO dynamics to detect and identify abnormal behavior patterns. When any abnormal behavior is identified, a warning message may be triggered.

The machine learning classifier for the given task may have the following ideal properties: (a) scalability, (b) ability to incorporate complex, heterogeneous input data, (c) predictive power, (d) stability with respect to data perturbations, and (e) interpretability. Typically, not all of these five properties can be satisfied to the same extent, and a suitable balance may be required. In the following, a machine learning method based on convolutional neural networks (CNNs) is provided for further illustration.

CNNs are very similar to the traditional neural networks. In a regular neural network, neural networks receive an input and transform the input through a series of hidden layers. Each hidden layer consists of a set of neurons, where each neuron is fully connected to all neurons in the previous layer. Neurons in a single layer function are completely independent and do not share any connections. The fully connected layer is called the "output layer" representing the class scores.

The drawbacks of the regular neural networks are that they don't scale well to full images. Taking an image with a size of 18×18×3 as an example, a single fully-connected neuron in a first layer of a regular neural network should have 18×18×3=972 weights. As the image size goes up, it will result in a large number of weights that need to be tuned, which may lead to the overfitting issue.

In one embodiment, a simple CNN may be a sequence of layers, and every layer of a CNN may transform one volume of activations to another through a differentiable function.

The CNN may include convolutional layer, pooling layer, and fully connected layer. CNNs may take advantage of the fact that the input consists of features, which constrain the architecture in a more sensible way. In particular, unlike a regular neural network, the layers of CNNs may have neurons arranged in 3 dimensions: width, height, depth.

CNNs have achieved great success in the image processing and computer vision. Also, CNN has been used in the natural language processing (NLP) with promising performance. A CNN operates by moving small filters across the input dataset. This means that the filters may be re-used for recognizing patterns thorough the whole input data. The CNN is much more powerful than the fully-connected networks (FCN) with the same number of variables, and in turn, makes the Convolutional networks faster to train.

The CNN may be made up of neurons that have learning weights and biases. Each neuron may receive some inputs, perform a dot product and optionally follow it with a non-linearity. The whole network still may express a single differentiable score function—from the raw image pixels on one end to class scores at the other. In addition, they may still have a loss function (e.g., SVM/Softmax) on the last (fully-connected) layer for the RSO behavior pattern prediction.

Figure 6:
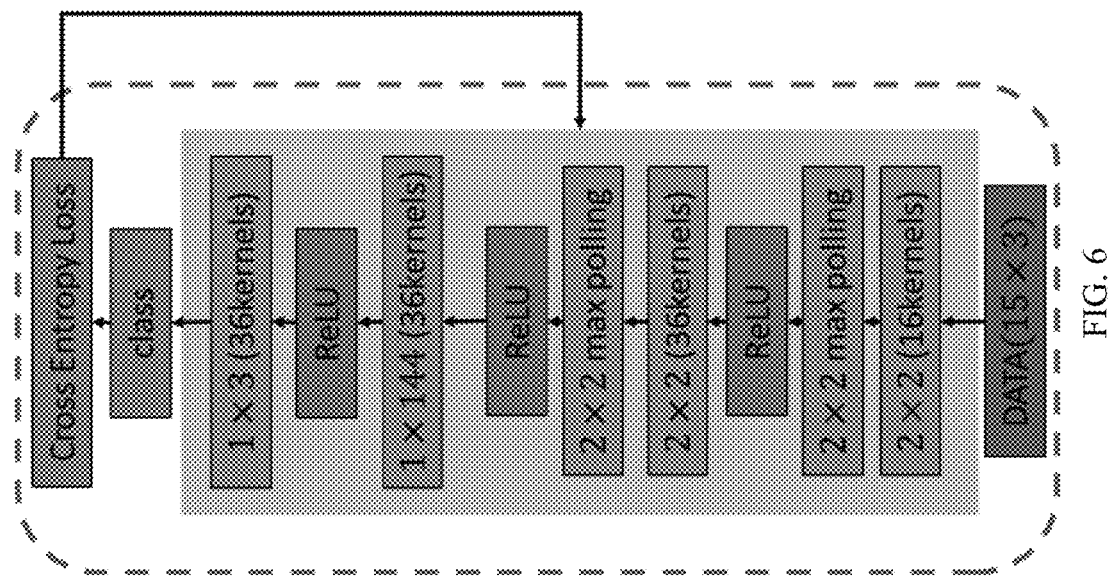
FIG. 6 illustrates a schematic diagram of a convolutional neural network (CNN) architecture for RSO behavior classification according to various embodiments of the present disclosure.

The AMIGO method may use CNNs to classify the RSO observation data. Comparing to the traditional approaches, the proposed CNN can produce a new way of processing RSO observations where quick determinations of RSO classes are made possible directly from the observational data. In order to evaluate the proposed CNN approach, the remaining training data may be used to testify the model performance. For example, Python and TensorFlow may be used as the simulation environment for the implementation. The training of the CNN classification approach may be computationally expensive, but it is expected that once trained on a larger dataset, the approach can outperform traditional methods while providing a computationally efficient classification model. The overall architecture of proposed machine learning model is shown in FIG. 6.

The input data may be processed in the first convolutional layer using the filter-weights. This may result in 16 new datasets with each one for a filter in the convolutional layer. The achieved dataset may also be down-sampled such that the size may be reduced from 15×3 to 8×2.

These 16 smaller data may then be processed in the second convolutional layer. Hence, filter-weights for each of these 16 channels, along with the filter-weights for each output channel of this layer, may be required. Corresponding to the 36 output channels, a total of 16×36=576 filters may be in the second convolutional layer. The resulting datasets may be down-sampled again to size 4×1. The output of the second convolutional layer includes 36 datasets each having a size of 4×1. The output may then be flattened to a single vector with a length of 4×1×36=144, and the single vector may be used as an input to a fully-connected layer with 128 neurons (or elements). The final processing may feed the fully-connected layer into another fully-connected layer with 3 neurons, one for each of the classes. The fully-connected layer with 3 neurons may be used to determine the class of the RSO behavior.

To generate the training data, the catalog tracks (space-track.org data) may be modified by adding the maneuvers. Different training labels may correspond to different maneuvers, e.g. label 1 may correspond to the maneuvers to increase the orbital energy, label 2 may correspond to the maneuvers to decrease the orbital energy, and label 3 may correspond to zero-maneuver. The steps to add maneuvers to space-track catalog data may be as the following:

(a) Convert the TLE to ECI at time 0.
(b) Call the methods specified in section 3 to propagate the satellites.
(c) Convert the 16 waypoints back to AZ, EL, Range, Range Rate relative to a ground site.

In one embodiment, 20,000 tracks are generated for training purpose and another 30,000 tracks are generated for testing.

The data format may be as the following:
Each row is an observation
Column 1: track id
Column 2: observation id (from 1 to 15)
Column 3: Azimuth angle (rad)
Column 4: Elevation angle (rad)
Column 5: Range (km)
Column 6: Training label (from 1 to m, where m is total types of space behavior)

In one embodiment, among over 20,000 training tracks, $\frac{1}{10}$ of the data is randomly selected as Test-Set for validating the CNN performance. The convolutional filters may be initially chosen at random, so the classification may be performed randomly.

For over 2000 RSO behavior, the model may not be able to correctly classify the RSO behavior patterns with 33.8% accuracy. The error between the predicted and true class of the input data may be measured by the so-called cross-entropy. The optimizer may then automatically propagate this error back through the Convolutional Network using the chain-rule of differentiation and update the filter-weights so as to improve the classification error. The optimization may be performed iteratively thousands of times until the classification error is sufficiently low.

It is noted that the computation in TensorFlow is actually done on a batch of datasets instead of a single dataset, which makes the computation more efficient. The result is that the flowchart of TensorFlow may actually have one more data-dimension when implemented in TensorFlow.

Figure 7:
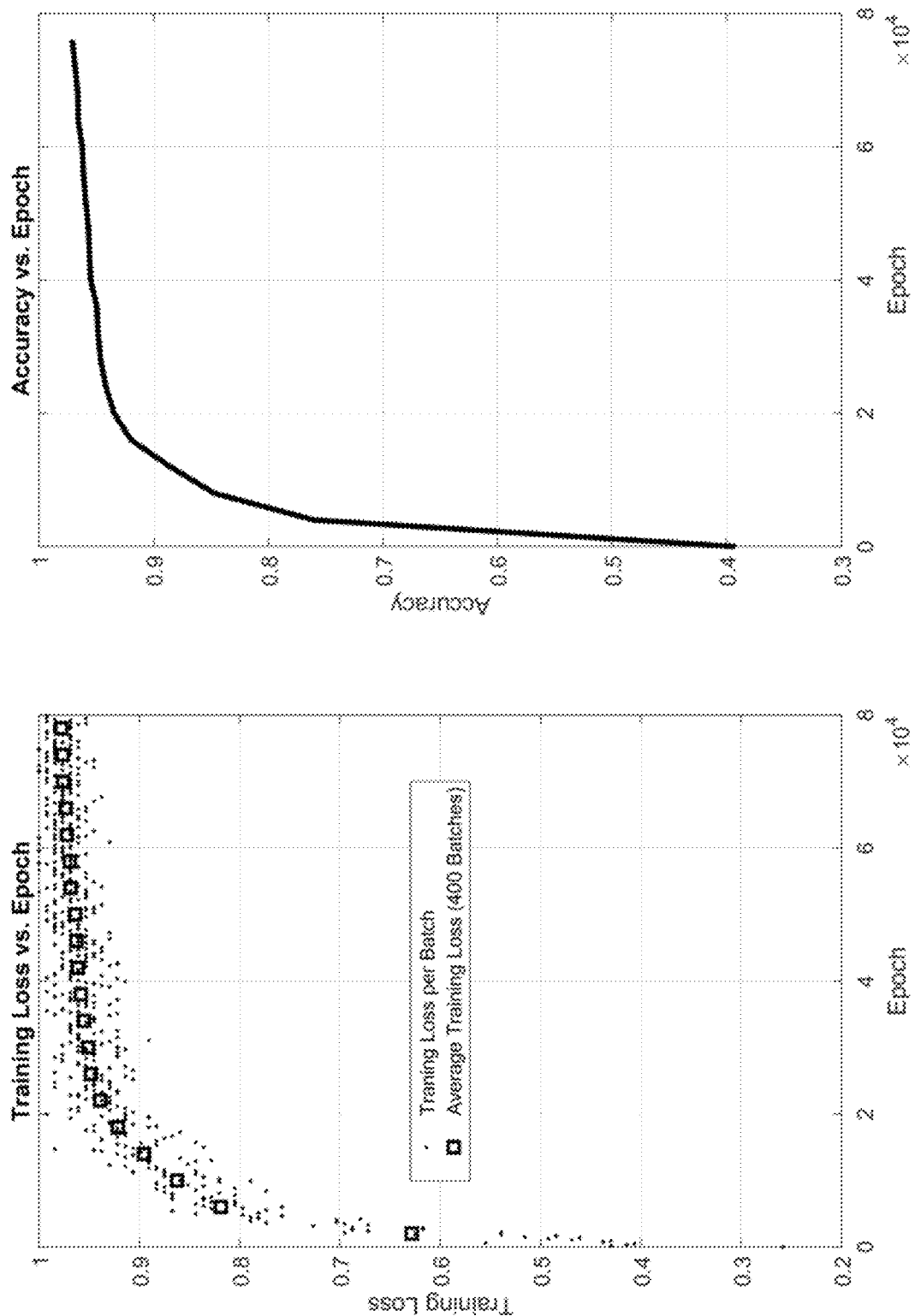
FIG. 7 illustrates a schematic convergence of an exemplary CNN model training process according to various embodiments of the present disclosure.
Figure 8:
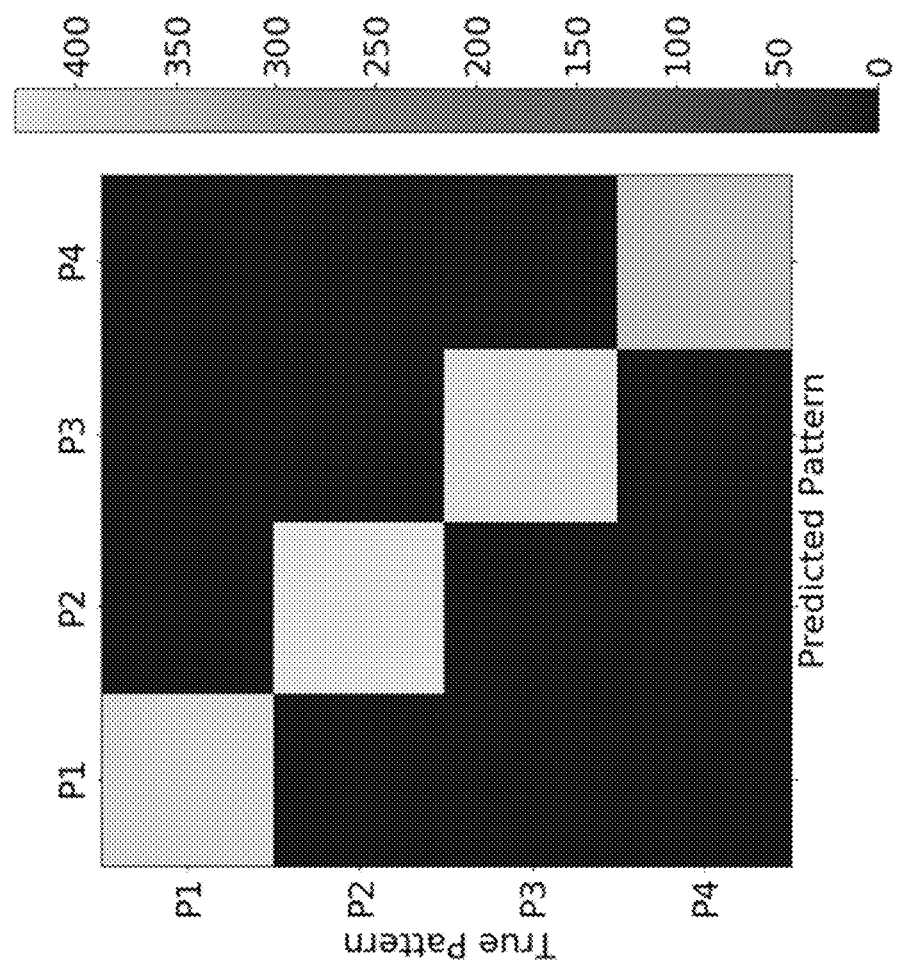
FIG. 8 illustrates a schematic performance of an exemplary CNN model obtained after training.
Figure 9:
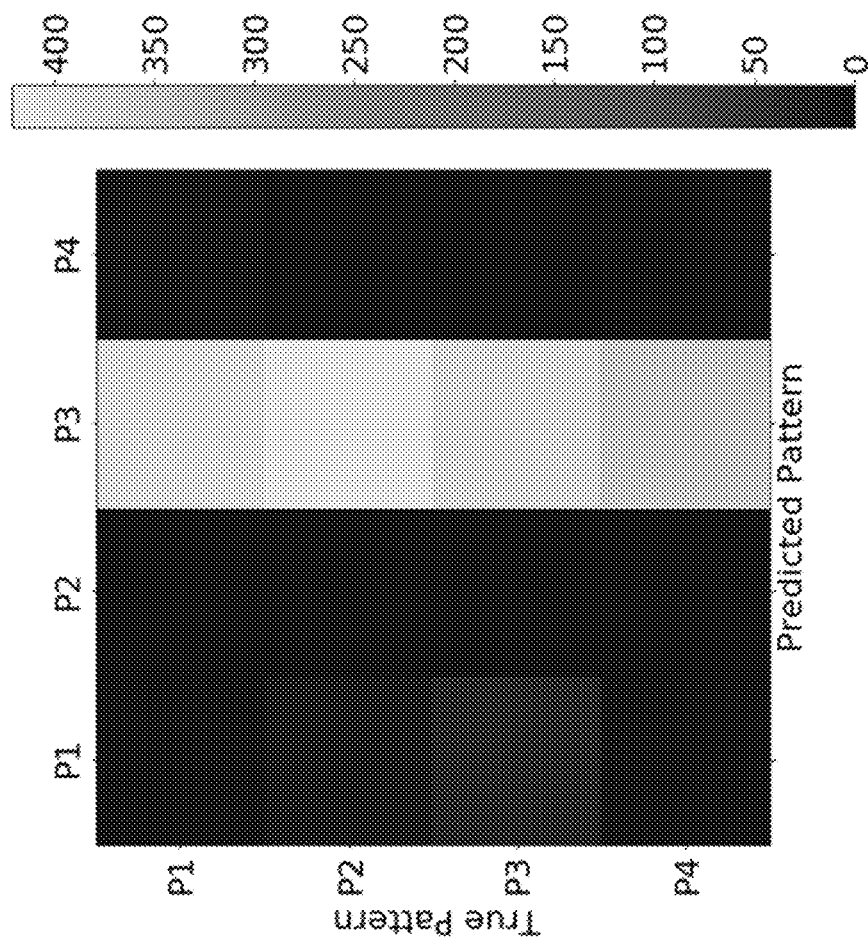
FIG. 9 illustrates a schematic performance of an exemplary CNN model obtained without training.

In the simulation, the batch size is set to be 128. FIG. 7 illustrates that as iteration increases, the training model converges nearly 100% accuracy. Shown in the left panel of FIG. 7, the dots represent the training loss per batch and the empty squares represent the average training loss for every 400 batches. The right panel of FIG. 7 indicates that the accuracy gradually becomes approaching 100% as iteration increases. The 20,000 randomly selected dataset may be used for evaluation for the well-trained CNN model, and the corresponding results may be seen through the confusion matrix shown in FIG. 8. It can be seen that the trained machine learning model can efficiently and correctly classify the RSO behavior with 99.8% (1996/2000). As a comparison, FIG. 9 illustrates a schematic diagram of the model performance without training.

Figure 10:
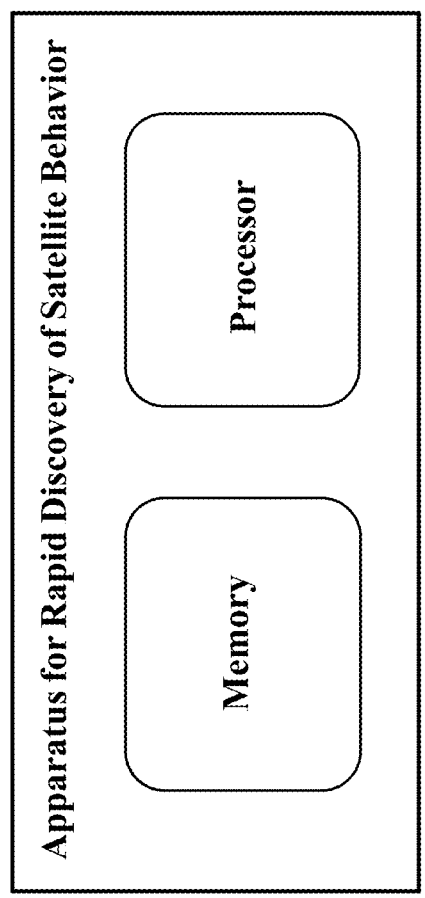
FIG. 10 illustrates a schematic diagram of an exemplary apparatus for rapid discovery of satellite behavior according to various embodiments of the present disclosure.

Further, the present disclosure also provides an apparatus for rapid discovery of satellite behavior. FIG. 10 illustrates a schematic diagram of an exemplary apparatus for rapid discovery of satellite behavior according to various embodiments of the present disclosure.

Referring to FIG. 10, the apparatus may include a processor and a memory. The apparatus may be used for rapid discovery of satellite behavior in a PE system that further includes at least one satellite and a plurality of space sensing assets. The memory may be configured to store computer-executable instructions. When the processor executes the computer-executable instructions stored in the memory, a method for rapid discovery of satellite behavior may be implemented. The method may include performing transfer learning and zero-shot learning to obtain a semantic layer using space data information. The space data information may include simulated space data based on a physical model. The method may further include receiving measured space-activity data of at least one satellite from a plurality of space sensing assets, and performing manifold learning on the measured space-activity data to obtain measured state-related parameters of the at least one satellite; modeling state uncertainty and uncertainty propagation of the at least one satellite based on the measured state-related parameters; and performing game reasoning based on a Markov game model to predict satellite behavior of the at least one satellite and management of the plurality of space sensing assets according to the semantic layer and the modeled state uncertainty and uncertainty propagation.

In one embodiment, the space data information used for transfer learning and zero-shot learning may further include the predicted satellite behavior of the at least one satellite.

According to the present disclosure, a machine learning design has been presented and implemented in the AMIGO method to discover space object behavior. The AMIGO method models the situation as a game instead of a control problem. The game reasoning utilizes data level fusion, stochastic modeling/propagation, and RSO detection/tracking to predict the future space relations. To generate the training data, the AMIGO method propagates the satellite positions using maneuvering strategies using a Marko game approach, which provides a method to solve the SSA problem for unknown behavior. For example, a satellite may exploit a sensing and tracking model to confuse the space sensors by corrupting their tracking estimates, while the space sensors may intend to decrease the tracking uncertainties. From the numerical results, it is shown that the trained machine learning model using a CNN can efficiently and correctly classify the RSO behavior with 99.8%.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A method for rapid discovery of satellite behavior, applied to a pursuit-evasion (PE) system including at least one satellite and a plurality of space sensing assets, comprising:
    performing transfer learning and zero-shot learning to obtain a semantic layer using space data information, wherein the space data information includes simulated space data based on a physical model and data collected by multiple sensors;
    obtaining measured space-activity data of the at least one satellite from the plurality of space sensing assets;
    performing manifold learning on the measured space-activity data to obtain measured state-related parameters of the at least one satellite;
    modeling state uncertainty and uncertainty propagation of the at least one satellite based on the measured state-related parameters; and
    performing game reasoning based on a Markov game model to predict satellite behavior of the at least one satellite and management of the plurality of space sensing assets according to the semantic layer and the modeled state uncertainty and uncertainty propagation, the satellite behavior including one or more of: a position of the at least one satellite relative to the observing station, a velocity, an orbital energy, or an angular momentum of the at least one satellite, wherein performing game reasoning based on the Markov game model to predict the satellite behavior of the at least one satellite and the management of the plurality of space sensing assets according to the semantic layer and the modeled state uncertainty and uncertainty propagation includes using a classifier model to detect satellite behavior patterns and identify abnormal satellite behavior patterns.

2. The method according to claim 1, wherein:
the space data information used for transfer learning and zero-shot learning further includes the predicted satellite behavior of the at least one satellite.

3. The method according to claim 1, wherein:
the semantic layer depicts relationships between features, attributes, and classes extracted from the space data information, and includes space pattern dictionary and/or semantic rules.

4. The method according to claim 1, further including:
in response to the predicted management of the plurality of space sensing assets different from current management of the plurality of space sensing assets, updating the management of the plurality of space sensing assets.

5. The method according to claim 1, wherein:
the state uncertainty is represented as a product of a Gaussian distribution of measurement noise and a Von-Mises distribution of initial condition uncertainty, wherein both distributions are defined on a cylindrical manifold $R^5 \times S$, where is a space of reals and S denotes a circular space.

6. The method according to claim 1, wherein:
the game reasoning performed based on the Markov game model is a Markov decision process, wherein:
    the at least one satellite and the plurality of space sensing assets in the PE system are players;
    a payoff function is defined for each action based on a predicted state of the PE system prior to the action and a measured state of the PE system after the action;
    an action-value function is defined as a sum of weighted payoff functions of actions taken in a preset period, wherein for every two consecutive actions, a discount factor ranging between 0 and 1 is used to weight a former action between the two consecutive actions; and
    performing game reasoning based on the Markov game model includes examining the action-value function for the actions taken in the preset period.

7. The method according to claim 1, wherein:
performing transfer learning and zero-shot learning to obtain the semantic layer includes modeling satellite behavior patterns of the at least one satellite, including extracting features from the space data information, and generating the classifier model through training using the extracted features.

8. The method according to claim 7, when an abnormal satellite behavior pattern is identified, further including:
    triggering a warning message.

9. An apparatus for rapid discovery of satellite behavior in a PE system that further includes at least one satellite and a plurality of space sensing assets, comprising:

a processor, and a memory, wherein:

the memory is configured to store computer-executable instructions; and when the processor executes the computer-executable instructions stored in the memory, a method for rapid discovery of satellite behavior is implemented, wherein the method includes:

performing transfer learning and zero-shot learning to obtain a semantic layer using space data information, wherein the space data information includes simulated space data based on a physical model and data collected by multiple sensors;

receiving measured space-activity data of the at least one satellite from the plurality of space sensing assets, and performing manifold learning on the measured space-activity data to obtain measured state-related parameters of the at least one satellite;

modeling state uncertainty and uncertainty propagation of the at least one satellite based on the measured state-related parameters; and performing game reasoning based on a Markov game model to predict satellite behavior of the at least one satellite and management of the plurality of space sensing assets according to the semantic layer and the modeled state uncertainty and uncertainty propagation, the satellite behavior including one or more of: a position of the at least one satellite relative to the observing station, a velocity, an orbital energy, or an angular momentum of the at least one satellite, wherein performing game reasoning based on the Markov game model to predict the satellite behavior of the at least one satellite and the management of the plurality of space sensing assets according to the semantic layer and the modeled state uncertainty and uncertainty propagation includes using a classifier model to detect satellite behavior patterns and identify abnormal satellite behavior patterns.

10. The apparatus according to claim 9, wherein:
the space data information used for transfer learning and zero-shot learning further includes the predicted satellite behavior of the at least one satellite.

11. The apparatus according to claim 9, wherein:
the semantic layer depicts relationships between features, attributes, and classes extracted from the space data information, and includes space pattern dictionary and/or semantic rules.

12. The apparatus according to claim 9, wherein:
in response to the predicted management of the plurality of space sensing assets different from current management of the plurality of space sensing assets, the method implemented by the apparatus further includes updating the management of the plurality of space sensing assets.

13. The apparatus according to claim 9, wherein:
the state uncertainty is represented as a product of a Gaussian distribution of measurement noise and a Von-Mises distribution of initial condition uncertainty, wherein both distributions are defined on a cylindrical manifold $R^5 \times S$, where is a space of reals and $S$ denotes a circular space.

14. The apparatus according to claim 9, wherein:
the game reasoning performed by the apparatus based on the Markov game model is a Markov decision process, wherein:
the at least one satellite and the plurality of space sensing assets in the PE system are players;
a payoff function is defined for each action based on a predicted state of the PE system prior to the action and a measured state of the PE system after the action;
an action-value function is defined as a sum of weighted payoff functions of actions taken in a preset period, wherein for every two consecutive actions, a discount factor ranging between 0 and 1 is used to weight a former action between the two consecutive actions; and
when performing game reasoning based on the Markov game model, the action-value function for the actions taken in the preset period is examined.

* * * * *